US007360634B2

(12) United States Patent
Gadelius

(10) Patent No.: US 7,360,634 B2
(45) Date of Patent: Apr. 22, 2008

(54) FRICTIONAL ENGAGEMENT DEVICE

(75) Inventor: Gustaf Gadelius, deceased, late of Stockholm (SE); by Monica Gadelius, legal representative, Stockholm (SE)

(73) Assignee: Gadloc AB, Enebyberg (SE)

( * ) Notice: Subject to any disclaimer, the term of this patent is extended or adjusted under 35 U.S.C. 154(b) by 144 days.

(21) Appl. No.: 10/547,300

(22) PCT Filed: Feb. 25, 2004

(86) PCT No.: PCT/SE2004/000256

§ 371 (c)(1),
(2), (4) Date: Aug. 29, 2005

(87) PCT Pub. No.: WO2004/076884

PCT Pub. Date: Sep. 10, 2004

(65) Prior Publication Data

US 2007/0163855 A1     Jul. 19, 2007

(30) Foreign Application Priority Data

Feb. 28, 2003 (SE) .................................. 0300519

(51) Int. Cl.
*F16D 41/00* (2006.01)
(52) U.S. Cl. ....................... 192/45.1; 74/162; 188/82.1; 192/45.2; 192/54.5

(58) Field of Classification Search ............... 192/45.2, 192/41 R, 45.1, 43, 72, 73, 78; 248/246; 74/162
See application file for complete search history.

(56) References Cited

U.S. PATENT DOCUMENTS

| 380,692 | A | * | 4/1888 | Pond et al. ................. 192/45.2 |
| 1,383,813 | A | * | 7/1921 | Jacobi ....................... 192/41 R |
| 1,880,457 | A | * | 10/1932 | Morley et al. ................ 192/43 |
| 3,021,925 | A | * | 2/1962 | Osborne ................... 192/41 R |
| 4,635,772 | A | * | 1/1987 | Gadelius .................... 192/45.2 |

FOREIGN PATENT DOCUMENTS

EP          0154106         9/1985

\* cited by examiner

*Primary Examiner*—Rodney H. Bonck
(74) *Attorney, Agent, or Firm*—Young & Thompson

(57) ABSTRACT

A device for frictional inter-engagement between two mutually movable parts (13, 14). A lever mechanism exerts counter-directed pressing forces towards both parts to transfers movement between them. A lever (25) has a free lever end (27) contacted by a first (13) of the parts, and opposite to the free end a part-cylindrical convex surface (31) journalled in a part-cylindrical concave bearing surface (33). In order to eliminate the risk of jamming of the lever due to excessive surface pressure, it is journalled with rolling bodies, preferably cylindrical bodies (34).

10 Claims, 2 Drawing Sheets

FRICTIONAL ENGAGEMENT DEVICE

BACKGROUND OF THE INVENTION

The present invention concerns a frictional engagement device, particularly for use in a freewheel mechanism.

DESCRIPTION OF THE RELATED ART

Swedish Patent No. 8307120-9 by the present inventor concerns an engagement device for frictional inter-engagement between two mutually movable parts. The mutual movement may be linear or rotational. In case the mutual movement is a rotational movement, as is the case when a freewheel mechanism is concerned, a first part may be an inner circular cylindrical body, and a second part may be an outer annular body co-axially arranged about the first part. When one of the parts, e.g., the inner body, is actuated to perform a rotational movement in one rotational direction, it positively engages an engagement device which in turn is caused to frictionally engage both parts so that the rotational movement is transferred to the other part, in this case the outer body, whereas rotational movement in the opposite direction of the inner body does not trig the engagement device to transfer movement between the parts. Thus, a reciprocating rotational movement of one of the parts will be transformed into a stepwise rotation in the one direction of the other part.

The engagement device according to the patent mentioned is constituted by a lever mechanism including a lever operable by the inner body so as to exert counter-directed pressing forces towards portions of both parts. A free end of the lever is contacted by a contact member of the inner body, whereas the opposite end of the lever is shaped with a part-cylindrical convex surface journalled in a corresponding part-cylindrical concave bearing surface of a block-shaped body. An opposite surface of this body is part-cylindrically shaped in conformity with an inner cylindrical surface of the outer body and is slidable therealong. When the contact member contacts the free end of the lever, its part-cylindrical surface slides in a rotational movement about a pivot axis in relation to the bearing surface of the block-shaped body. A clamp body eccentrically carried by the lever then contacts and presses against the radially outer periphery of an axial flange of the outer body, whereas the part-cylindrical convex surface of the lever simultaneously exerts a corresponding pressure against the opposed concave surface of the block-shaped body. This, in turn, presses its part-cylindrical surface against the inner periphery of the outer annular body. At the time a sufficient pressure is achieved, and thereby a sufficient frictional engagement in the two contact areas, the engagement device is operative to transfer rotational movement and torque between the inner body and the outer body, or, vice versa.

In operation of this known mechanism, it has turned out that movement of the inner body in the opposite direction does not always sufficiently release the inter-engagement between the part-cylindrical surface of the block-shaped body and the inner periphery of the outer annular body to disengage these two bodies from one another so as to allow the freewheel function.

It is believed that the reason for this phenomenon is that the surface pressure in the contact area between the part-cylindrical convex surface of the lever and the part-cylindrical concave surface of the block-shaped body tends to become so high that the oil film in the contact surface is overloaded and breaks, thus resulting in metallic contact.

SUMMARY OF THE INVENTION

An object of the present invention is to find a solution to this problem, i.e., to provide bearing means for the lever that withstands extremely high contact pressures.

According to the present invention this is accomplished by providing—instead of a plain slide bearing—a bearing utilizing rolling bodies, preferably a needle bearing.

BRIEF DESCRIPTION OF THE DRAWINGS

An embodiment of the invention will now be described, reference being made to the accompanying drawings, wherein.

DESCRIPTION OF THE PREFERRED EMBODIMENTS

Figure 1:
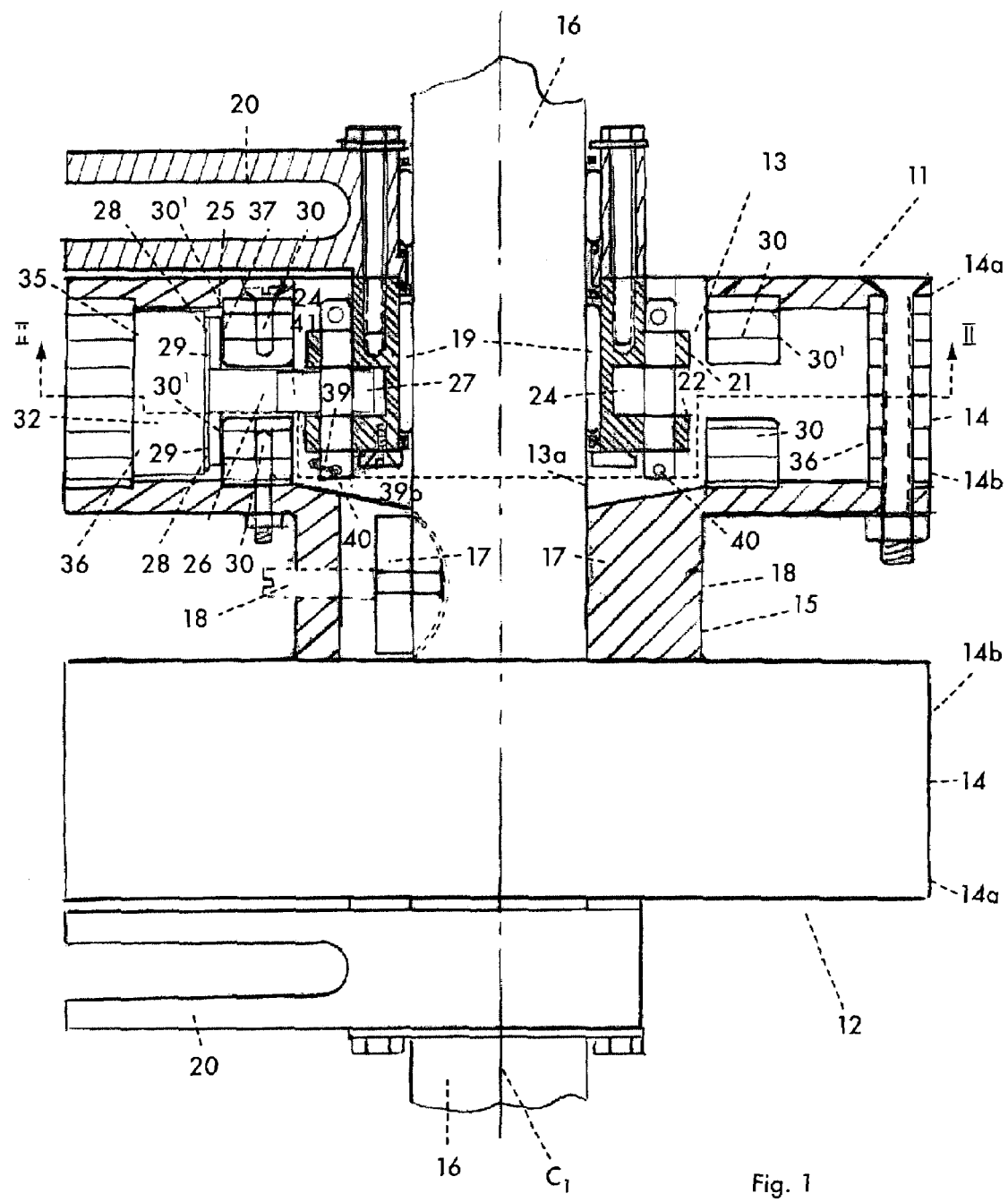
FIG. 1 is a part-sectional view of a device utilizing two freewheel mechanisms.

The device shown in FIG. 1 includes two equal freewheel mechanisms 11 and 12, mechanism 11 being shown in axial section. Each mechanism includes an inner annular body 13 and an outer annular body 14 co-axially arranged about the inner body. The outer body constitutes a housing for the device and comprises—for each mechanism—two housing parts 14a and 14b, the housing parts 14b of the two mechanisms being joined by a common hub portion 15. The hub portion 15 is keyed to a shaft 16 by means of, e.g., opposed woodruff keys 17 secured by screws 18. The shaft 16 extends through the inner bodies 13 of both mechanisms and is journalled therein by means of needle bearings 19. The axis of the shaft is denominated $C_1$.

Figure 2:
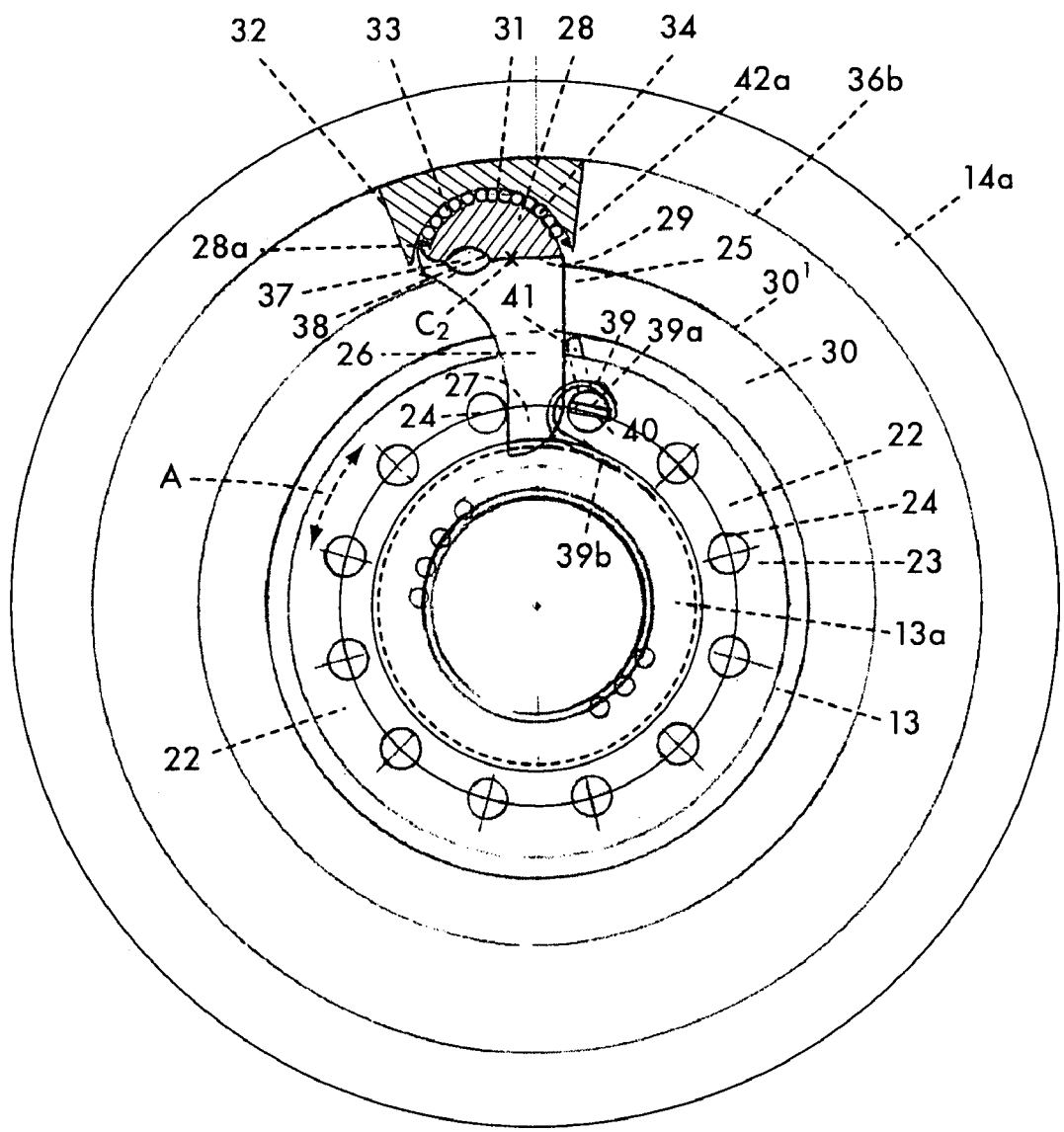
FIG. 2 is a part-sectional view along line II-II in FIG. 1.

Each inner body 13 is connected to an arm 20 by means of which reciprocating stepwise rotational movements may be imparted to the inner bodies in an alternating manner (arrow A in FIG. 2).

Each inner body has two radially extending, parallel flanges 21, 22, each having a plurality of annularly equally spaced bores 23. Each pair of aligned bores receives a pin 24. Each of a plurality of T-shaped levers 25 (only one being shown) has a web portion 26 having a free lever end 27 introduced into the free space between two adjacent pins 24.

An opposed end of each lever includes two flange portions 28 extending in opposite directions from the web portion 26 (FIG. 1). Each of the flange portions has a generally flat surface 29 facing a surface 30' of a respective axially directed, annular flange 30 of the body 14. Furthermore, the flange portions have a common part-cylindrical surface 31 convexly curved about an axis $C_2$ (FIG. 2).

A block-shaped pressure member 32 has a part-cylindrical surface 33 concavely curved about the axis $C_2$, but having a somewhat larger radius. A plurality of cylindrical bodies 34, together forming a needle bearing, have diameters corresponding to the difference in diameters between the two concentric part-cylindrical surfaces 31 and 33 and occupy the free space between them. Apparently, a swinging motion of the lever 25 about the axis $C_2$ will cause the cylindrical bodies 34 of the needle bearing to roll between the part-cylindrical surfaces 31 and 33.

The pressure member 32 has a part-cylindrical, convexly curved surface 35 abutting an internal cylindrical surface 36 of the outer body 14 and being slidable therealong.

Upon rotation of the inner annular body 13 in a clockwise direction according to FIG. 2, one pin 24 contacts the free end 27 of the lever 25 and moves it to the right of FIG. 2.

Hereby, the entire lever 25 rotates about the axis $C_2$ causing one end of each surface 29 of the flange portions 28 to approach a respective one of the surfaces 30' of the annular flanges 30. Thereby, a pressure body 37 supported in an eccentrically located recess 38 in the respective surface 29 contacts the respective surface 30' exerting a pressure thereon. Simultaneously, the convex surface 31 of the lever exerts a corresponding pressure against the bodies 34 of the needle bearing, and they in turn press on the concave surface 33 of the pressure member 32 which, in turn, presses its surface 35 against the surface 36 of the outer body 14.

Typical values of the operative lever arms of lever 25 are about 20 mm from the contact area between pin 24 to the axis $C_2$ and from about 2 mm to about 4 mm from the axis $C_2$ to the contact area between the pressure body 37 and the surface 30'.

Consequently, there is a simultaneous clamping frictional engagement at two locations between the lever/pressure member combination and the outer body 14, viz., its surfaces 30' and 36.

In the prior art arrangement initially referred to, the pressure body is a circular cylinder. In the embodiment of the present invention shown in FIG. 2, it is preferred to make the pressure body 37 with an oval cross section, thereby achieving a better pressure distribution, particularly in the contact area with the surface 30'.

Operation of a freewheel mechanism utilizing improved engagement devices as described above has revealed that there is no tendency whatsoever for the lever to become stuck in its clamping position. On the contrary, immediately upon release of the engaging rotational force, the engagement devices loosen their clamping engagement with the outer body, and the inner body 13 together with the operating arm 20 is free to move in the opposite direction. It should be pointed out here, that movements of the lever 25 are extremely small; in practice, its stroke from engagement to disengagement is invisible with the naked eye.

In order to avoid a possible 'slow' engagement of a lever 25, and also a possible rattling noise in operation, it is preferred to resiliently urge the levers 25 in their engagement direction. This is shown here to be accomplished by a helical spring 39 having one leg 39a engaged in a groove 40 in a free end of a pin 24 and one leg 39b supported in a circumferential groove 13a of the inner body 13. In this case, the pin 24 is mounted in the radial flanges 21, 22 in a manner allowing at least a limited rotational movement. Furthermore, it carries a radially extending arm 41, which, due to the spring action of spring 39, exerts a constant resilient pressure on the web portion 26 of the lever 25 such that its free end 27 is in constant contact with a pin 24 as seen in FIG. 1.

In order to prevent a possible escape of the needles 34, the pressure member 32 is provided with a lip 42a preventing escape in one direction, and the flanges 28 are provided with lips 28a preventing escape in the other direction.

The invention claimed is:

1. A frictional engagement device for frictional inter-engagement between two mutually movable parts (13,14), comprising:
   a lever mechanism operable by a first (13) of the two parts so as to exert counter-directed pressing forces towards portions of both of the two parts,
   the lever mechanism including a lever (25) having a free lever end (27) and opposite thereto a part-cylindrical convex surface (31) journalled in a corresponding part-cylindrical concave bearing surface (33) of a block-shaped pressure member (32) slidable along a surface (36b) of a second (14) of the two parts,
   the lever (25) being reciprocatingly rotatable about an axis (C2) common to the part-cylindrical surfaces (31, 33) and having a contact portion (37) eccentric in relation to said axis (C2),
   the contact portion (37) contacting a portion (30') of the second part (14) upon actuation of the lever,
   the part-cylindrical convex surface (31) journalled in the corresponding part-cylindrical concave bearing surface (33) by means of rolling bodies (34); and
   an escape arrangement preventing an escape of the rolling bodies (34), comprising
   i) a lip (42a) provided on said pressure member (32), said lip preventing escape of the rolling bodies (34) in one direction, and
   ii) flanges (28) provided with other lips (28a) preventing escape of the rolling bodies (34) in another direction, wherein,
   the rolling bodies (34) maintain the convex surface (31) and the concave bearing surface (33) at a distance from each other preventing a metallic contact being established between the convex surface (31) and the concave bearing surface (33).

2. The device according to claim 1, characterized in that the rolling bodies are cylindrical bodies (34).

3. The device according to claim 2, characterized by resilient means (39) constantly urging the lever (25) in its actuating direction.

4. The device according to claim 1, characterized by resilient means (39) constantly urging the lever (25) in its actuating direction.

5. The device according to claim 4, characterized in that the first part (13) carries a stud (24) operable to contact the free lever end (27).

6. The device according to claim 1, characterized in that the contact portion is a separate pressure member (37).

7. The device according to claim 6, characterized in that the pressure member (37) has an oval cross section.

8. The device according to claim 1, characterized in that the first part (13) carries a stud (24) operable to contact the free lever end (27).

9. A frictional engagement device for frictional inter-engagement between two mutually movable parts (13,14), comprising:
   a lever mechanism operable by a first (13) of the parts so as to exert counter-directed pressing forces towards portions of both parts, the lever mechanism including a lever (25) having a free lever end (27) and opposite thereto a part-cylindrical convex surface (31) journalled in a corresponding part-cylindrical concave bearing surface (33) of a block-shaped pressure member (32) slidable along a surface (36b) of a second (14) of the parts,
   the lever (25) being reciprocatingly rotatable about an axis(C2) common to the part-cylindrical surfaces (31, 33) and having a contact portion (37) eccentric in relation to said axis (C2), the contact portion (37) contacting a portion(30') of the second part (14) upon actuation of the lever,
   the part-cylindrical convex surface (31) journalled in the corresponding part-cylindrical concave bearing surface (33) by means of rolling bodies (34); and
   a resilient means (39) constantly urging the lever (25) in its actuating direction, wherein,
   the first part (13) carries a stud (24) operable to contact the free lever end (27), the stud (24) is rotatably carried by the first part (13), and
the resilient means is a helical spring (39) carried by the stud (24) and having one leg (39a) engaged in the stud and one leg (39b) contacting a portion (13a) of the first part, the stud (24) carrying an arm (41) contacting the free lever end (27).

10. A frictional engagement device for frictional interengagement between two mutually movable parts (13,14), comprising:
  a lever mechanism operable by a first (13) of the two parts so as to exert counter-directed pressing forces towards portions of both of the two parts;
  a block-shaped pressure member (32) slidable along a surface (36b) of a second (14) of the two parts,
  the lever mechanism including a lever (25) having
  i) a free lever end (27) and,
  ii) opposite to the free lever end (27), a part-cylindrical convex surface (31) journalled in a corresponding part-cylindrical concave bearing surface (33) of the block-shaped pressure member (32),
  the lever (25) being reciprocatingly rotatable about an axis (C2) common to the part-cylindrical surfaces (31, 33) and having a contact portion (37) eccentric in relation to said axis (C2),
  the contact portion (37) contacting a portion (30') of the second part (14) upon actuation of the lever,
  the part-cylindrical convex surface (31) journalled in the corresponding part-cylindrical concave bearing surface (33) by means of rolling bodies (34); and
  an escape arrangement preventing an escape of the rolling bodies (34), the escape arrangement comprising
  i) a lip (42a) provided on said pressure member (32), said lip preventing escape of the rolling bodies (34) in one direction, and
  ii) flanges (28) provided with other lips (28a) preventing escape of the rolling bodies (34) in another direction, the rolling bodies (34) being located between the pressure member and the flanges (28), wherein,
  the rolling bodies (34) maintain the convex surface (31) and the concave bearing surface (33) at a distance from each other preventing a metallic contact being established between the convex surface (31) and the concave bearing surface (33).

\* \* \* \* \*